(12) United States Patent
Braduke et al.

(10) Patent No.: US 11,418,335 B2
(45) Date of Patent: Aug. 16, 2022

(54) SECURITY CREDENTIAL DERIVATION (71) Applicant: Hewlett-Packard Development Company, L.P., Spring, TX (US)

(72) Inventors: Rosilet Retnamoni Braduke, Spring, TX (US); Baraneedharan Anbazhagan, Spring, TX (US); Christopher H. Stewart, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/052,367

(22) PCT Filed: Feb. 1, 2019

(86) PCT No.: PCT/US2019/016261
§ 371 (c)(1),
(2) Date: Nov. 2, 2020

(87) PCT Pub. No.: WO2020/159533
PCT Pub. Date: Aug. 6, 2020

(65) Prior Publication Data
US 2021/0359854 A1    Nov. 18, 2021

(51) Int. Cl.
*G06F 21/78* (2013.01)
*H04L 9/08* (2006.01)
(Continued)

(52) U.S. Cl.
CPC ............ *H04L 9/0869* (2013.01); *G06F 21/70* (2013.01); *G06F 21/78* (2013.01); *H04L 9/3242* (2013.01)

(58) Field of Classification Search
CPC .......... G06F 21/78; G06F 21/34; G06F 21/62; G06F 21/60; G06F 21/70; G06F 21/71;
(Continued)

(56) References Cited

U.S. PATENT DOCUMENTS 5,269,022 A    12/1993   Shinjo et al.
5,327,531 A    7/1994    Bealkowski et al.
(Continued)

FOREIGN PATENT DOCUMENTS

CN    1534685 A    10/2004
CN    1612115 A    5/2005
(Continued)

OTHER PUBLICATIONS

"TMS320C31 Embedded Control", Texas Instruments <http://www.ti.com/lit/an/spru083/spru083.pdf>, Feb. 1998.
(Continued)

*Primary Examiner* — Shaqueal D Wade-Wright
(74) *Attorney, Agent, or Firm* — Trop, Pruner & Hu P.C.

(57) ABSTRACT

In some examples, a device includes a memory, a processor, and a controller separate from the processor to derive a security credential based on information comprising a key accessible by the controller. The controller communicates the derived security credential in a secure manner to a program code executable on the processor, and uses the derived security credential to protect data stored in the memory against unauthorized access.

20 Claims, 4 Drawing Sheets

(51) Int. Cl.
*H04L 9/32* (2006.01)
*G06F 21/70* (2013.01)

(58) Field of Classification Search
CPC ..... G06F 21/76; H04L 9/0869; H04L 9/3242; H04L 9/0861; H04L 9/0877
See application file for complete search history.

(56) References Cited

U.S. PATENT DOCUMENTS

| | | |
|---|---|---|
| 5,432,927 A | 7/1995 | Grote et al. |
| 5,469,573 A | 11/1995 | McGill, III et al. |
| 5,564,054 A | 10/1996 | Bramnick et al. |
| 5,713,024 A | 1/1998 | Halladay |
| 5,745,669 A | 4/1998 | Hugard et al. |
| 5,778,070 A | 7/1998 | Mattison |
| 5,819,087 A | 10/1998 | Le et al. |
| 5,822,581 A | 10/1998 | Christeson |
| 5,828,888 A | 10/1998 | Kozaki et al. |
| 5,918,047 A | 6/1999 | Leavitt et al. |
| 5,987,605 A | 11/1999 | Hill et al. |
| 6,205,527 B1 | 3/2001 | Goshey et al. |
| 6,223,336 B1 | 4/2001 | Tojima |
| 6,275,930 B1 | 8/2001 | Bonamico |
| 6,539,473 B1 | 3/2003 | Hubacher et al. |
| 6,651,188 B2 | 11/2003 | Harding et al. |
| 6,665,813 B1 | 12/2003 | Forsman et al. |
| 6,711,675 B1 | 3/2004 | Spiegel et al. |
| 6,934,881 B2 | 8/2005 | Gold et al. |
| 6,990,577 B2 | 1/2006 | Autry |
| 7,069,445 B2 | 6/2006 | Cheston et al. |
| 7,100,087 B2 | 8/2006 | Yang et al. |
| 7,136,994 B2 | 11/2006 | Zimmer et al. |
| 7,193,895 B2 | 3/2007 | Jin et al. |
| 7,203,808 B2 | 4/2007 | Rothman et al. |
| 7,340,595 B2 | 3/2008 | Blinick et al. |
| 7,383,431 B2 | 6/2008 | Takamizawa et al. |
| 7,409,539 B2 | 8/2008 | Arnez et al. |
| 7,483,810 B2 | 1/2009 | Jackson et al. |
| 7,613,872 B2 | 11/2009 | Dayan et al. |
| 7,734,945 B1 | 6/2010 | Levidow et al. |
| 7,818,622 B2 | 10/2010 | Burks, III et al. |
| 7,890,726 B1 | 2/2011 | Falik et al. |
| 7,900,091 B2 | 3/2011 | Chou et al. |
| 7,908,470 B1 | 3/2011 | Cavanna |
| 7,930,532 B2 | 4/2011 | Lin et al. |
| 7,930,576 B2 | 4/2011 | Harris et al. |
| 8,006,125 B1 | 8/2011 | Meng et al. |
| 8,082,384 B2 | 12/2011 | Sareen et al. |
| 8,086,841 B2 | 12/2011 | Guo et al. |
| 8,132,253 B2 | 3/2012 | Martinez et al. |
| 8,190,950 B2 | 5/2012 | Chen et al. |
| 8,255,988 B2 | 8/2012 | Carpenter |
| 8,316,200 B2 | 11/2012 | Matsuoka et al. |
| 8,341,386 B2 | 12/2012 | Lee |
| 8,392,762 B2 | 3/2013 | Aralakuppe Ramegowda et al. |
| 8,429,391 B2 | 4/2013 | Galbo et al. |
| 8,489,922 B2 | 7/2013 | Matthew |
| 8,732,527 B2 | 5/2014 | Tabone et al. |
| 9,063,836 B2 | 6/2015 | Swanson et al. |
| 9,251,380 B1 | 2/2016 | Au et al. |
| 9,411,688 B2 | 8/2016 | Poolla et al. |
| 9,417,967 B2 | 8/2016 | Huang et al. |
| 9,542,195 B1 | 1/2017 | Astarabadi et al. |
| 9,575,768 B1 | 2/2017 | Kim |
| 9,734,339 B2 | 8/2017 | Jeansonne et al. |
| 9,785,596 B2 | 10/2017 | Hodge et al. |
| 9,852,298 B2 | 12/2017 | Jeansonne et al. |
| 9,880,908 B2 | 1/2018 | Jeansonne et al. |
| 9,990,255 B2 | 6/2018 | Jeansonne et al. |
| 10,089,472 B2 | 10/2018 | Jeansonne et al. |
| 2001/0008011 A1 | 7/2001 | Oba |
| 2002/0002652 A1 | 1/2002 | Takahashi |
| 2002/0078338 A1 | 6/2002 | Lay et al. |
| 2003/0079007 A1 | 4/2003 | Merkin |
| 2003/0126511 A1 | 7/2003 | Yang et al. |
| 2003/0212936 A1 | 11/2003 | Neuman et al. |
| 2003/0221114 A1 | 11/2003 | Hino et al. |
| 2004/0025002 A1 | 2/2004 | Cepulis et al. |
| 2004/0030877 A1 | 2/2004 | Frid |
| 2004/0068334 A1 | 4/2004 | Tsai et al. |
| 2004/0076043 A1 | 4/2004 | Boals et al. |
| 2004/0133790 A1 | 7/2004 | Hensley |
| 2004/0153846 A1 | 8/2004 | Lee |
| 2004/0193862 A1 | 9/2004 | Lin |
| 2004/0268079 A1 | 12/2004 | Riedle et al. |
| 2005/0033954 A1 | 2/2005 | Wang et al. |
| 2005/0081090 A1 | 4/2005 | Lin |
| 2005/0108564 A1 | 5/2005 | Freeman et al. |
| 2005/0190699 A1 | 9/2005 | Smith et al. |
| 2005/0210180 A1 | 9/2005 | Rothman et al. |
| 2005/0251673 A1 | 11/2005 | Bosley et al. |
| 2005/0273588 A1 | 12/2005 | Ong et al. |
| 2006/0020844 A1 | 1/2006 | Gibbons et al. |
| 2006/0075395 A1 | 4/2006 | Lee et al. |
| 2006/0143431 A1 | 6/2006 | Rothman et al. |
| 2006/0161784 A1 | 7/2006 | Hunter et al. |
| 2006/0168435 A1 | 7/2006 | Svensson et al. |
| 2006/0184799 A1* | 8/2006 | Seo ........................ G06F 21/79 713/182 |
| 2006/0225067 A1 | 10/2006 | Yang |
| 2006/0236198 A1 | 10/2006 | Llntz, Jr. et al. |
| 2007/0088943 A1 | 4/2007 | Phelps et al. |
| 2007/0260866 A1 | 11/2007 | Wang et al. |
| 2008/0040596 A1 | 2/2008 | Mai et al. |
| 2008/0066075 A1 | 3/2008 | Nutter et al. |
| 2008/0072030 A1 | 3/2008 | Karpa |
| 2008/0086629 A1 | 4/2008 | Dellow |
| 2008/0086631 A1 | 4/2008 | Chow et al. |
| 2008/0090653 A1 | 4/2008 | Kuehling et al. |
| 2008/0098381 A1 | 4/2008 | Lin |
| 2008/0126779 A1 | 5/2008 | Smith |
| 2008/0126782 A1 | 5/2008 | Dayan et al. |
| 2008/0141016 A1 | 6/2008 | Chang et al. |
| 2008/0155331 A1 | 6/2008 | Rothman et al. |
| 2008/0172558 A1 | 7/2008 | Stakutis et al. |
| 2008/0195750 A1 | 8/2008 | Sadovsky et al. |
| 2008/0209553 A1 | 8/2008 | Lu et al. |
| 2008/0269954 A1 | 10/2008 | Lev et al. |
| 2008/0288767 A1 | 11/2008 | Wang et al. |
| 2008/0307134 A1 | 12/2008 | Geissler et al. |
| 2009/0049293 A1 | 2/2009 | Jiang |
| 2009/0063834 A1 | 3/2009 | Huang et al. |
| 2009/0089570 A1 | 4/2009 | Andrianov |
| 2009/0100287 A1 | 4/2009 | Chu et al. |
| 2009/0150598 A1 | 6/2009 | Jung et al. |
| 2009/0150662 A1 | 6/2009 | Desselle et al. |
| 2009/0158020 A1 | 6/2009 | Chen et al. |
| 2009/0158024 A1 | 6/2009 | Hung et al. |
| 2009/0172639 A1 | 7/2009 | Natu et al. |
| 2009/0217373 A1 | 8/2009 | Stillerman et al. |
| 2009/0240934 A1 | 9/2009 | Chou |
| 2009/0248955 A1 | 10/2009 | Tamada |
| 2009/0249113 A1 | 10/2009 | Chou et al. |
| 2009/0271602 A1 | 10/2009 | Burks, III et al. |
| 2009/0327684 A1 | 12/2009 | Zimmer et al. |
| 2010/0017589 A1 | 1/2010 | Reed et al. |
| 2010/0064127 A1 | 3/2010 | Lee |
| 2010/0070800 A1 | 3/2010 | Hanna |
| 2010/0082960 A1 | 4/2010 | Grobman et al. |
| 2010/0082968 A1 | 4/2010 | Beverly |
| 2010/0100720 A1 | 4/2010 | Wu et al. |
| 2010/0115187 A1 | 5/2010 | Wu et al. |
| 2010/0115256 A1 | 5/2010 | Challener |
| 2010/0169551 A1 | 7/2010 | Yano et al. |
| 2010/0235617 A1 | 9/2010 | Chen |
| 2010/0299493 A1 | 11/2010 | McGee, III |
| 2010/0299560 A1 | 11/2010 | Lin |
| 2011/0029742 A1 | 2/2011 | Grube et al. |
| 2011/0060899 A1 | 3/2011 | Hsieh et al. |
| 2011/0066837 A1 | 3/2011 | Lee et al. |
| 2011/0087872 A1 | 4/2011 | Shah et al. |
| 2011/0093675 A1 | 4/2011 | Lu et al. |
| 2011/0093741 A1 | 4/2011 | Liang et al. |
| 2012/0011393 A1 | 1/2012 | Roberts et al. |

(56) References Cited

U.S. PATENT DOCUMENTS

| | | | |
|---|---|---|---|
| 2012/0072710 A1 | 3/2012 | Gupta et al. | |
| 2012/0072897 A1 | 3/2012 | Selvam | |
| 2012/0079174 A1 | 3/2012 | Nellans et al. | |
| 2012/0210165 A1 | 8/2012 | Lambert et al. | |
| 2012/0239920 A1 | 9/2012 | Yang | |
| 2012/0297178 A1 | 11/2012 | Peng et al. | |
| 2012/0303944 A1 | 11/2012 | Peng et al. | |
| 2012/0324150 A1 | 12/2012 | Moshayedi et al. | |
| 2013/0013905 A1 | 1/2013 | Held et al. | |
| 2013/0047031 A1 | 2/2013 | Tabone et al. | |
| 2013/0159690 A1 | 6/2013 | Tsukamoto et al. | |
| 2013/0163764 A1* | 6/2013 | van den Berg | G06F 21/572 380/278 |
| 2013/0232325 A1 | 9/2013 | Jang et al. | |
| 2014/0115314 A1 | 4/2014 | Huang et al. | |
| 2014/0237223 A1 | 8/2014 | Chudgar et al. | |
| 2014/0281455 A1 | 9/2014 | Kochar | |
| 2014/0325203 A1 | 10/2014 | Roche et al. | |
| 2015/0095631 A1 | 4/2015 | Rahardjo et al. | |
| 2015/0095632 A1 | 4/2015 | Huang et al. | |
| 2015/0242656 A1 | 8/2015 | Dasari et al. | |
| 2015/0301880 A1 | 10/2015 | Allu et al. | |
| 2015/0324588 A1 | 11/2015 | Locke | |
| 2015/0381647 A1 | 12/2015 | Huang et al. | |
| 2016/0055113 A1* | 2/2016 | Hodge | G06F 13/4022 710/308 |
| 2016/0055332 A1* | 2/2016 | Jeansonne | G06F 9/4406 726/22 |
| 2016/0055338 A1 | 2/2016 | Jeansonne et al. | |
| 2016/0063255 A1 | 3/2016 | Jeansonne et al. | |
| 2016/0211977 A1 | 7/2016 | Kohiyama | |
| 2016/0246964 A1 | 8/2016 | Martinez et al. | |
| 2016/0294802 A1 | 10/2016 | Xiao et al. | |
| 2016/0316370 A1 | 10/2016 | Boyapalle et al. | |
| 2016/0364570 A1 | 12/2016 | Stern | |
| 2017/0249002 A1 | 8/2017 | Costa et al. | |
| 2017/0337380 A1* | 11/2017 | Domke | G06F 9/442 |
| 2018/0279394 A1 | 9/2018 | Peng et al. | |

FOREIGN PATENT DOCUMENTS

| | | |
|---|---|---|
| CN | 1799028 | 7/2006 |
| CN | 1928843 | 3/2007 |
| CN | 100472657 | 3/2009 |
| CN | 101458743 | 6/2009 |
| CN | 101894054 | 11/2010 |
| CN | 101965570 | 2/2011 |
| CN | 102239472 | 11/2011 |
| CN | 102971742 | 3/2013 |
| EP | 2034780 | 3/2009 |
| KR | 20090034104 | 4/2009 |
| KR | 20090060774 | 6/2009 |
| KR | 20100017874 | 2/2010 |
| KR | 101038567 | 6/2011 |
| TW | 480444 | 3/2002 |
| TW | I280487 | 5/2007 |
| TW | 200809489 | 2/2008 |
| TW | 200842567 | 11/2008 |
| TW | 200931312 | 7/2009 |
| TW | 200941344 | 10/2009 |
| TW | 201007465 | 2/2010 |
| TW | 201020785 | 6/2010 |
| TW | 201133342 | 10/2011 |
| WO | WO-2010135485 | 11/2010 |
| WO | WO-2012148422 | 11/2012 |

OTHER PUBLICATIONS

James Bottomley's random Pages, Anatomy of the UEFI Boot Sequence on the Intel Galileo, blog.handsenpartnership.com, downloaded Jan. 3, 2019 (5 pages).

HP Sure Start, Technical white paper, Automatic firmware intrusion detection and repair, Feb. 2018 (14 pages).

Lee, "Embedded Controller Usage in Low Power Embedded Designs, an Overview", < http://download.intel.com/design/intarch/papers/326133.pdf >, Sep. 2011.

Patelay; "A Single-chip Solution for System-supervisory Functions", <http://www.embedded-control-europe.com/digitalissues/ecejun10/files/ecejun10.pdf >, Jun. 18, 2010.

Regenscheid et al., "BIOS Integrity Measurement Guidelines (Draft)", <http://csrc.nist.gov/publications/drafts/800-155/draft-SP800-155_Dec2011.pdf>, Dec. 2011.

Wikipedia, HMAC last edited Dec. 18, 2018 (5 pages).

Wikipedia, PBKDF2 last edited Dec. 30, 2018 (4 pages).

Wikipedia, Trusted Platform Module last edited Dec. 27, 2018 (8 pages).

Yin et al., "Verification-based Multi-backup Firmware Architecture, an Assurance of Trusted Boot Process for the Embedded Systems", 2011 International Joint Conference of IEEE TrustCom-11, pp. 1188-1195.

* cited by examiner

SECURITY CREDENTIAL DERIVATION

BACKGROUND

Electronic devices can include various components for performing different tasks. For example, the components can include a processor, a memory, an embedded controller, an input/output (I/O) device, and other components. Various code (in the form of machine-readable instructions including firmware and/or software) are executable on the embedded controller, the processor, and other components.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

An electronic device is vulnerable to an attack by an unauthorized entity, such as malware loaded into the electronic device, or a user that attempts to gain unauthorized access of the electronic device. Examples of electronic devices include any or some combination of the following: computers (e.g., desktop computers, notebook computers, tablet computers, server computers, etc.), handheld devices (e.g., smartphones, game appliances, etc.), wearable devices (e.g., smart watches, head-mounted devices, smart eyeglasses, etc.), Internet-of-Things (IoT) devices, controllers in vehicles, storage systems, communication nodes, and so forth.

An electronic device can include a memory that is used to store data. In some examples, the memory may be in the form of a nonvolatile memory, which is a memory that retains stored data even if power is removed from the memory. In other examples, a memory can include volatile memory, which is a memory that loses its stored data if power is removed from the memory.

An unauthorized entity may attempt to access certain information stored in a memory. The unauthorized entity can be in the form of malware executing in an electronic device. Alternatively, the unauthorized entity can be a user who may attempt to gain access to information stored in a memory.

To protect against unauthorized access of data stored in a memory, the data may be protected such that access of the data is possible if a requester of the data presents a security credential, such as a password, an encryption key, or another type of credential.

As an example, a boot code may store, in the memory, data associated with establishing a wireless connection with a wireless network (e.g., a wireless local area network or WLAN, a cellular network, etc.). The data for establishing the wireless connection with the wireless network may include a password or private key that is used to gain access to the wireless network. The boot code may be configured to automatically establish the wireless connection with the wireless network, such as during a pre-boot phase of the electronic device. The pre-boot phase can refer to a phase prior to starting of an operating system of the electronic device. It may be inconvenient to seek user input of the password or private key each time the boot code attempts to establish a wireless connection. Thus, the password or private key may be stored in the memory for use by the boot code in automatically performing pre-boot establishment of the wireless connection.

Although an example is described in the context of pre-boot establishment of a wireless connection with a wireless network, it is noted that the data stored in the memory can also be used to perform a wireless connection with the wireless network after the electronic device has completed booting.

Also, in other examples, other types of data (used for other purposes) stored in a memory may be subject to unauthorized access.

An unauthorized entity may attempt to gain access of the password or other private data stored in the memory that the unauthorized entity can then use to gain access of the wireless network, or for another purpose.

To protect against unauthorized access of the data stored in the memory, the data may be encrypted using an encryption key. Some example techniques of generating encryption keys may be associated with various issues. For example, a key derivation technique that prompts a user to enter a password or other information for deriving an encryption key may reduce user convenience since the user has to remember the information to be entered to generate the encryption key. In other examples, an electronic device may have to implement a specialized cryptographic subsystem to generate the encryption key, which may be associated with increased complexity and cost of the electronic device.

Figure 1:
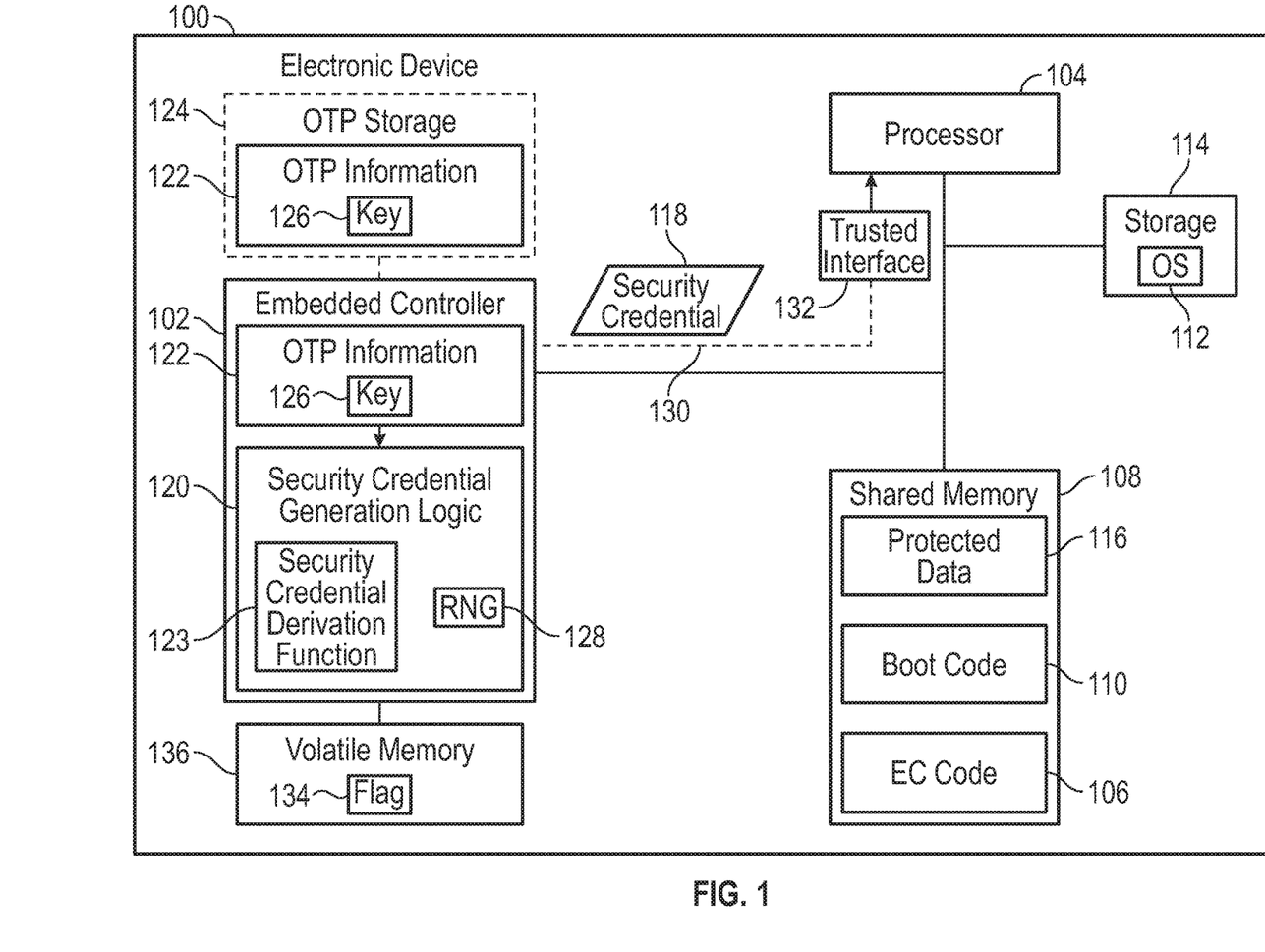
FIG. 1 is a block diagram of an electronic device according to some examples.

In accordance with some implementations of the present disclosure, as shown in FIG. 1, an electronic device 100 includes an embedded controller 102 to generate a security credential 118 that can be used to protect data stored in a memory against unauthorized access. The electronic device 100 further includes a processor 104 that is separate from the embedded controller 102.

In some examples, the embedded controller 102 can be used to perform specific tasks. The tasks of the embedded controller 102 can be performed by embedded controller (EC) code 106, in the form of machine-readable instructions such as EC firmware or EC software, executed on the embedded controller 102. In other examples, the tasks of the embedded controller 102 can be performed by a hardware processing circuit of the embedded controller 102. Examples of tasks that can be performed by the embedded controller 102 include any one or some combination of the following: power supply control in the electronic device 100 (for controlling a power supply that supplies power supply voltages to various components in the electronic device 100), charging and control of a battery in the electronic device 100, thermal monitoring (to monitor a temperature in the electronic device 100), fan control (to control a fan in the electronic device 100), and interaction with a user input device (such as performing a scan of a keyboard of the electronic device 100 or interaction with a pointing device such as a mouse, touchpad, touchscreen, and so forth). In other examples, the embedded controller 102 can perform additional or alternative tasks. The embedded controller 102 can be implemented with a microcontroller, an application-specific integrated circuit (ASIC), a programmable gate array (PGA), or any other type of programmable circuit.

The security credential 118 generated by the embedded controller 102 can be in the form of an encryption key, a password, or any other information that can be used to encrypt data or otherwise protect data against unauthorized access. For example, a requester is unable to access encrypted information unless the requester presents an encryption key that can be used to decrypt the encrypted information. In other examples, an access mechanism prevents access of the information unless a security credential (e.g., a password, a security code, etc.) is presented that matches a specified security credential.

The embedded controller 102 has access to specified information that is inaccessible to the processor 104 or any other entity in the electronic device 100. The specified information can include a key or any other type of information that the embedded controller 102 is able to access. Another component (such as the processor 104) is unable to access the specified information. The embedded controller 102 is able to generate the security credential 118 based on the specified information that no other entity in the electronic device 100 can access. The derived credential 118 can be shared with a program code (including machine-readable instructions) executable on the processor 104, so that the embedded controller 102 does not have to share the specified information (such as the key in the specified information) with another entity.

In some examples, the specified information can be hardcoded into the embedded controller 102. For example, the specified information can be hardcoded by fusing the specified information into the embedded controller 102. Fusing refers to programming fuses of the embedded controller 102 to provide a collection of values that make up the specified information. In further examples, the embedded controller 102 can include an internal nonvolatile storage to store the specified information. As yet further examples, the specified information can be stored in an external nonvolatile storage that is external to and accessible by the embedded controller 102. The internal or external nonvolatile storage is electrically isolated way from any other entities (other than the embedded controller 102), and thus inaccessible, to the other entities of the electronic device. The internal or external nonvolatile storage in such examples may include a one-time programmable (OTP) storage, which is a storage that can be programmed once with data values. Once the OTP storage is programmed, the data values stored in the OTP storage cannot be changed.

In the foregoing examples in which the specified information is fused into the embedded controller 102 or stored in an (internal or external) OTP storage, the specified information can be referred to as OTP information 122. Such OTP information 122 can also be referred to as "hardware information." Although reference is made to "OTP information" in the present discussion, in other examples, other specified information stored in re-writable storage can be used for deriving an encryption key or other security credential.

FIG. 1 shows that the OTP information 122 can be part of the embedded controller 102 (either fused or stored in an internal OTP storage), or alternatively, can be stored in an external OTP storage 124. The OTP information 122 can be programmed in the embedded controller 102 or in the external OTP storage 124 at build time of the electronic device 100 at a factory or as part of the configuration of the electronic device 100 prior to delivery to an end user.

In some examples, the OTP information 122 includes a key 126. This key that is part of the OTP information 122 may be referred to as a "hardware key" that the embedded controller 102 can use to encrypt information.

As discussed further below, a security credential generation logic 120 of the embedded controller 102 can use the OTP information 122 to derive the security credential 118. The security credential generation logic 120 can be implemented using a portion of the hardware processing circuit of the embedded controller 102, or alternatively, can be implemented as machine-readable instructions (e.g., part of the EC code 106) executable by the embedded controller 102.

The security credential 118 being derived based on the OTP information 122 can refer to the security credential 118 being derived based on the entirety of the OTP information 122 or a portion of the OTP information 122, and possibly based on additional information (discussed further below).

The embedded controller 102 can transmit the derived security credential 118 in a secure manner to a program code executable by the processor 104. A discussion of how information can be communicated in a "secure manner" is provided further below. Note that the derived security credential 118 that is transferred to the program code in the secure manner is inaccessible by any other entity of the electronic device 100 outside the context of the secure transfer. Further, no other entity (aside from the embedded controller 102) can derive the derived security credential 118 because no other entity can access the OTP information 122.

Note that the OTP information 122 (or a portion of the OTP information 122) is not communicated to the program code, so that the OTP information (portion) 122 is not exposed to the program code executable by the processor 104. Consequently, even if the electronic device 100 is subject to an attack by an entity that has access to the processor 104 (e.g., malware executable on the processor 104), the OTP information 122 is protected against unauthorized access. The derived security credential 118 can be considered to be equivalent in cryptographic integrity with the OTP information 122. However, the derived security credential 118 is not identical to the OTP information 122 (or to a key in the OTP information 122).

The program code executable on the processor 104 can encrypt data stored in a memory (e.g., shared memory 108) using the derived security credential 118. Such encrypted data is represented as protected data 116 in FIG. 1. "Protected data" refers to any data that is to be protected against unauthorized access by a malicious entity, such as malware, an unauthorized user, and so forth. In other examples, the security credential 118 can protect the data (protected data 116) in the shared memory 108 in a different manner—for example, an access mechanism (e.g., a memory controller, a file system, etc.) that manages access of the data stored in the shared memory 108 may prompt for the security credential 118 before allowing access of the data.

In examples according to FIG. 1, the EC code 106 executable by the embedded controller 102 is stored in the shared memory 108. The shared memory 108 can include a nonvolatile memory, such as a flash memory or other type of nonvolatile memory. The shared memory 108 is accessible by various components of the electronic device 100, including the embedded controller 102, the processor 104, and other components. The shared memory 108 can also store a boot code 110, which is used for booting the electronic device 100 or to resume the electronic device 100 from a low power state. The boot code 110 can be in the form of a Basic Input/Output System (BIOS) code.

The BIOS code can perform checking of hardware components to ensure that the hardware components are present and functioning properly. This can be part of a power-on self-test (POST) procedure, for example. After the POST procedure, the BIOS code can progress through the remainder of a booting sequence, after which the BIOS code can load and pass control to an operating system (OS) 112. BIOS code can also refer to Unified Extensible Firmware Interface (UEFI) code. In some examples, the BIOS code can also include a runtime portion that is executed after the OS 112 loads.

Although FIG. 1 shows the entirety of the boot code 110 stored in the shared memory 108, it is noted that in other examples, a first portion of the boot code 110 is stored in the shared memory 108, while another portion of the boot code 110 is stored in a separate storage, such as a storage 114. The storage 114 can include a persistent storage, such as a persistent storage implemented using a disk-based storage, a solid state storage, and so forth. The OS 112 is also stored in the storage 114. In other examples, if the shared memory 108 has sufficient capacity, the OS 112, or a portion of the OS 112, can also be stored in the shared memory 108.

In the example of FIG. 1, the protected data 116, the boot code 110 (or a portion of the boot code 110), and the EC code 106 are stored in the shared memory 108. In other examples, the foregoing pieces of data or program code can be stored in different memories or storage. Note that the boot code 110 and the EC code 106 (or portions of the boot code 110 and EC code 106) can be considered to be part of the protected data 116 in some examples.

Further examples of the protected data 116 can include any or some combination of the following: data useable to establish a wireless connection with a wireless network (e.g., a password or other private data such as a private key that is used as part of the process of establishing the wireless connection), other passwords and/or keys, configuration information for the electronic device 100 or components of the electronic device 100, program code, or any other information deemed to be sensitive such that it is to be protected against unauthorized access.

To generate the security credential 118, the OTP information (portion) 122 is input as a seed to a security credential derivation function 123 executed by the security credential generation logic 120. As an example, the security credential generation function 123 executed by the security credential generation logic 120 is a key derivation function, such as a Password-Based Key Derivation Function 2 (PBKDF2). The key derivation function can apply a pseudorandom function, such as a hash-based message authentication code (HMAC), to an input seed (which in this case includes the OTP information 122 or a portion of the OTP information 122) to generate a derived encryption key. The derived encryption key is an example of the security credential 118.

In some examples, the portion of the OTP information 122 used by the key derivation function can include the hardware key 126 that is part of the OTP information 122.

Another input to the key derivation function can include a salt value, which can include a random number produced by a random number generator (RNG) 128, which can be part of (or be coupled to) the security credential generation logic 120. Thus, the OTP information (portion) 122 and the random number produced by the RNG 120 are input to the key derivation function, which produces a derived encryption key.

In other examples, another type of the security credential derivation function 123 can be used by the security credential generation logic 120 to produce the security credential 118.

The security credential 118 can be communicated in a secure manner over a secure channel 130 to a program code executed by the processor 104. For example, the program code executed by the processor 104 can include the boot code 110. Communicating the security credential 118 in the secure channel 130 protects the security credential 118 against unauthorized access by an entity that executes in the electronic device 100 or that has access to the electronic device 100. The protection against the unauthorized access in the secure channel 130 can be based on use of a protection code and/or use of a trusted interface between the embedded controller 102 and the processor 104.

In some examples, the protection code to protect the security credential 118 communicated in the secure channel 130 includes a value that can be used to verify the integrity of the security credential 118. For example, the protection code can be in the form of an HMAC, which can be used to verify the integrity of the security credential 118, as well as the authenticity of information (e.g., a message) that includes the security credential 118. Note that the HMAC is not used to encrypt the information including the security credential 118, but rather, an HMAC value is transferred with the information including the security credential 118, and the HMAC value (e.g., an HMAC hash value) can be used to verify the integrity and the authenticity of the information including the security credential 118.

In further examples, as an alternative to or in addition to using a protection code such as an HMAC to protect communication of the security credential 118 over the secure channel 130, a trusted interface 132, such as in the form of a trusted application programming interface (API), can be used as part of the secure channel 130. The trusted interface 132 can have an open state or a closed state. In the open state, the trusted interface 132 allows for information to be passed between the embedded controller 102 and a program code (e.g., the boot code 110) executing on the processor 104. In the closed state, the trusted interface 132 does not allow for communication of information between the embedded controller 102 and the program code executing on the processor 104.

Whether the trusted interface 132 is open or closed is based on a flag 134 stored in a volatile memory 136 connected to the embedded controller 102. A volatile memory can include a dynamic random access memory (DRAM), a static random access memory (SRAM), or any other type of memory that loses its content if power is removed from the memory.

The flag 134 can include a bit or multiple bits stored in the volatile memory 136. If the flag 134 is set to a first value, then the trusted interface 132 is in the open state. However, if the flag 134 is set to a different second value, then the trusted interface 132 is in the closed state. In some examples, when the electronic device 100 initially starts, the flag 134 can default to the first value that corresponds to the trusted interface 132 being in the open state. During the time that the flag 134 is set to the first value, the trusted interface 132 can be used to perform communication between the embedded controller 102 and a program code (e.g., the boot code 110) executing on the processor 104.

During the time that the flag 134 is set to the first value and the trusted interface 132 is in the open state, the program code that executes on the processor 104 is deemed to be secure. For example, during this time, the part of the boot code 110 that executes on the processor 104 is from a secure portion of the shared memory 108 or is subject to verification, such as by the embedded controller 102, so that the electronic device 100 can trust the part of the boot code 110 that executes while the trusted interface 132 is in the open state.

The boot code 110 executing on the processor 104 can subsequently inform the embedded controller 102 to set the flag 134 to the second value that corresponds to the trusted interface 132 being in the closed state. For example, the boot code 110 can inform the embedded controller 102 to set the flag 134 to the second value in response to the boot code 110 exiting a specified phase. Alternatively, the embedded controller 102 can close the trusted interface 132 by setting the flag 134 to the second value after the derived security credential 118 has been retrieved once.

Thus, more generally, the trusted interface 132 is available for communicating information during an initial boot phase of the boot code 110, and unavailable for communicating information after the initial boot phase of the boot code 110.

For example, the trusted part of the boot code 110 that can execute while the trusted interface 132 is open can include a Platform Initialization (PI) or Pre-EFI (PEI) code of the BIOS. The PI or PEI code can retrieve the derived security credential 118 over the open trusted interface 132, after which either the BIOS can close the trusted interface 132 or the embedded controller 102 closes the trusted interface 132 after the derived security credential 118 has been retrieved once. The PI/PEI stage of execution is deemed a trusted platform state, since a small number of entities are running at this point, and none are deemed capable of intruding on the embedded controller 102 to BIOS communication. The PEI code can make the derived security credential 118 available in a piece of memory referred to in the UEFI context as a hand-off block (HOB). An early Driver eXecution Environment (DXE) code of the BIOS can read the HOB; store the content of the HOB in a System Management Random Access Memory (SMRAM); and finally, securely delete the HOB's contents from memory using a cryptographically secure overwrite method. The DXE phase is the phase of the boot code 110 when the boot code 110 loads drivers for configured components in an electronic device 100. The early DXE code is deemed to be just as secure as the PI/PEI code. Before other code is allowed to execute, the DXE code locks the SMRAM so that no other entity can read from or write to the content (which includes the derived security credential 118) of the SMRAM. The BIOS code can read, update, or delete the content of the SMRAM—however, no other entity is able to access the SMRAM. As a result, storage of the derived security credential 118 in the SMRAM is deemed relatively secure.

After the trusted interface 132 is closed, the trusted interface 132 can be re-opened by a power on/off cycle of the electronic device 100, and the foregoing process can be re-iterated.

The secure channel 130 can refer to either or both of: a channel (such as a bus or other communication link) over which information is protected by a protection code (e.g., an HMAC), or the trusted interface 132.

For example, if the HMAC is used (and the trusted interface 132 is not used) to protect the security credential 118, the embedded controller 102 generates an HMAC, and transmits the security credential 118 along with the HMAC to the boot code 110 (or other program code) executable on the processor 104.

If the trusted interface 132 is used (but the HMAC is not used) to protect the security credential 118, the embedded controller 102 transmits the security credential 118 to the boot code 110 (or other program code) executable on the processor 104 while the trusted interface 132 is in the open state. Once the trusted interface 132 transitions to the closed state, the embedded controller 102 does not transmit the security credential 118 to the boot code 110 (or other program code).

In other examples, both the HMAC and the trusted interface 132 can be used. In such examples, key information used for deriving the HMAC can be exchanged between the embedded controller 102 and boot code 110 (or other program code) executing on the processor 104 while the trusted interface 132 is in the open state. Once the trusted interface 132 transitions to the closed state, exchanging key information between the embedded controller 102 and a program code executing on the processor 104 is not performed. However, in the closed state of the trusted interface 132, the HMAC can be used to protect the security credential 118 communicated between the embedded controller 102 and the boot code 110 (or other program code) executing on the processor 104.

After receiving the security credential 118 from the embedded controller 102, the boot code 110 (or other program code) executing on the processor 104 can use the security credential 118 to encrypt data or otherwise protect data that is stored as the protected data 116 in the shared memory 108. For example, if the security credential 118 is a derived encryption key, the derived encryption key can be used by the boot code 110 (or other program code) to encrypt data that is stored as the protected data 116. The encrypted protected data 116 is not accessible by an entity that does not have the encryption key.

As another example, the protected data 116 stored in the shared memory 108 is not encrypted. However, the boot code 110 (or other program code) can manage access of the protected data 116 using the security credential 118.

Figure 2:
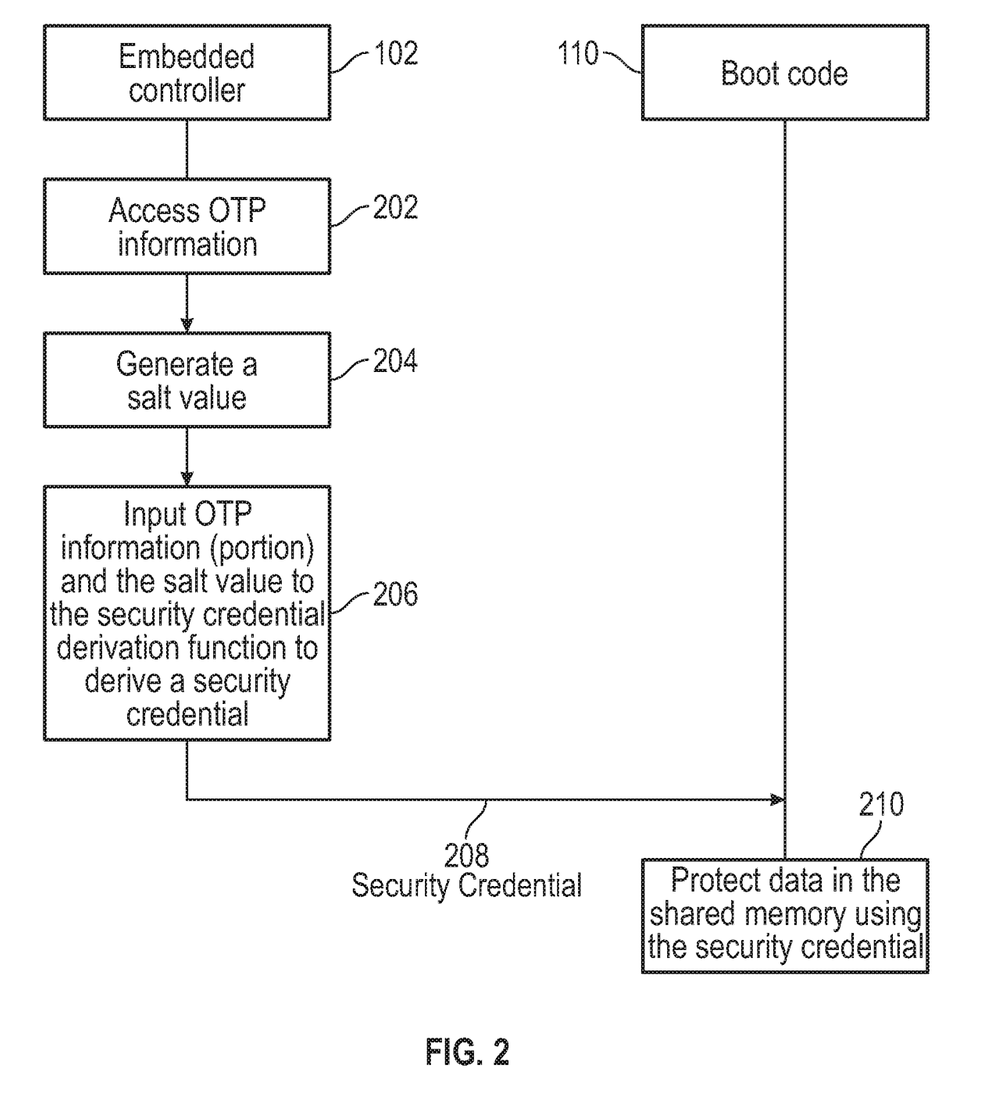
FIG. 2 is a flow diagram of a process according to some examples.

FIG. 2 is a message flow diagram of a process according to some examples, which can be performed by the embedded controller 102 and the boot code 110 executed on the processor 104. The embedded controller 102 accesses (at 202) the OTP information 122. The embedded controller 102 generates (at 204) a salt value. For example, the salt value is a random number, and the embedded controller 102 uses the RNG 120 to generate the random number.

The OTP information (or a portion of the OTP information 122) and the salt value are input (at 206) to the security credential derivation function 123 to derive the security credential 118.

The embedded controller 102 sends (at 208) the derived security credential 118 over the secure channel 130 to the boot code 110. The boot code 110 protects (at 210) data using the derived security credential 118, and the protected data is stored as the protected data 116 in the shared memory 108.

Figure 3:
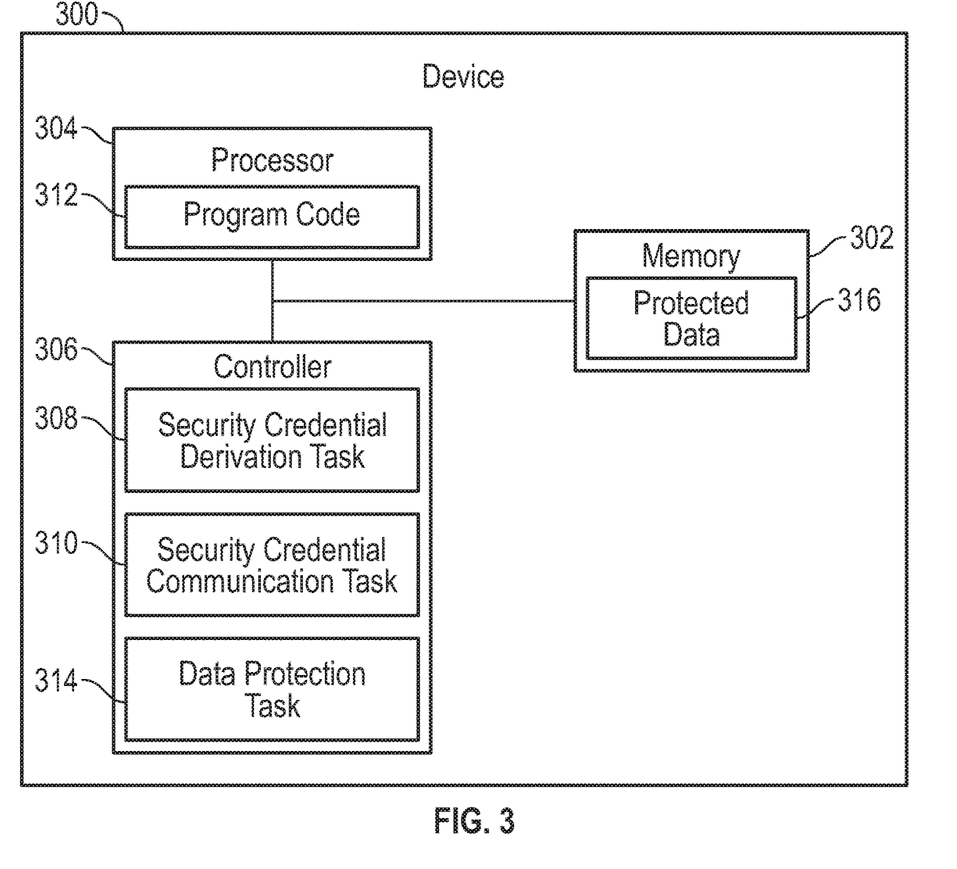
FIG. 3 is a block diagram of a device according to some examples.

FIG. 3 is a block diagram of a device 300 (e.g., an electronic device) that includes a memory 302, a processor 304, and a controller 306 (similar to the embedded controller 102, for example) separate from the processor 304. A processor can include a microprocessor, a core of a multi-core microprocessor, a microcontroller, a programmable integrated circuit, a programmable gate array, a digital signal processor, or another hardware processing circuit.

The controller 306 can perform various tasks. The tasks include a security credential derivation task 308 that derives a security credential based on information (e.g., the OTP information 122) including a key (e.g., the hardware key 126) accessible by the controller 306. Note that security credential can be derived based on just the hardware key 126, or based on the hardware key 126 and other information, such as the remaining portion of the OTP information 122.

The tasks further include a security credential communication task 310 that communicates the derived security credential in a secure manner to a program code 312 executable on the processor 304.

The tasks further include a data protection task 314 that uses the derived security credential to protect data 316 stored in the memory 302 against unauthorized access.

Figure 4:
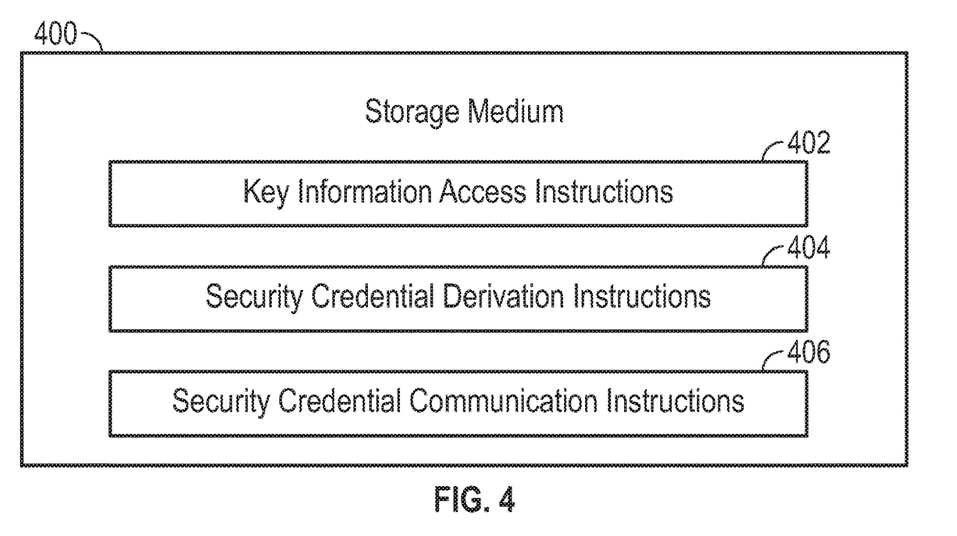
FIG. 4 is a block diagram of a storage medium storing machine-readable instructions according to some examples.

FIG. 4 is a block diagram of a non-transitory machine-readable or computer-readable storage medium 400 that stores machine-readable instructions executable by a controller to perform respective tasks. The machine-readable instructions include key information access instructions 402 to access information comprising a key accessible by the controller and inaccessible by a processor that is separate from the controller. The machine-readable instructions further include security credential derivation instructions 404 to input the information including the key into a security credential derivation function to produce a derived security credential.

The machine-readable instructions additionally include security credential communication instructions 406 to communicate the derived security credential over a secure channel to a program code executable on the processor, the derived security credential for use in protecting data stored in a memory.

Figure 5:
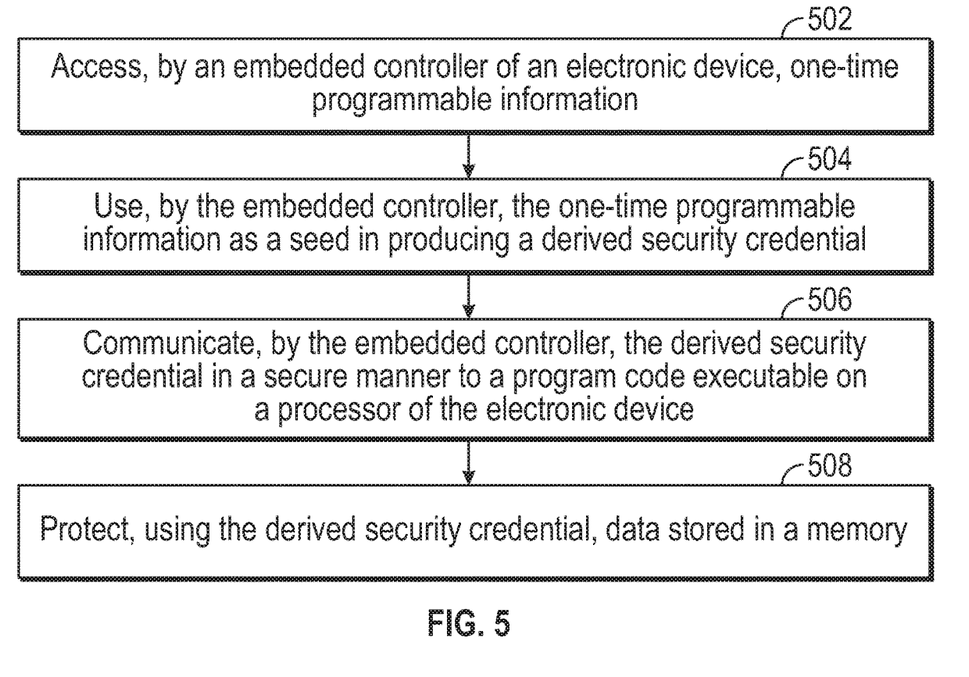
FIG. 5 is a flow diagram of a process according to further examples.

FIG. 5 is a flow diagram of a process according to some examples. The process includes accessing (at 502), by an embedded controller of an electronic device, one-time programmable information.

The process includes using (at 504), by the embedded controller, the one-time programmable information as a seed in producing a derived security credential. The process further includes communicating (at 506), by the embedded controller, the derived security credential in a secure manner to a program code executable on a processor of the electronic device. The process further includes protecting (at 508), using the derived security credential, data stored in a memory.

The storage medium 400 (FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A device comprising:
a memory;
a processor; and
a controller separate from the processor to:
   derive a security credential based on information comprising a key accessible by the controller;
   communicate the derived security credential in a secure manner to a program code executable on the processor, wherein the program code comprises a boot code for booting the device, and wherein the derived security credential is communicated in the secure manner using a trusted interface between the controller and the boot code, the trusted interface being available for communicating information during an initial boot phase of the boot code, and unavailable for communicating information after the initial boot phase of the boot code,
wherein the program code is executable on the processor to use the derived security credential to protect data stored in the memory against unauthorized access.

2. The device of claim 1, wherein the controller comprises an embedded controller.

3. The device of claim 1, wherein the information comprising the key is hardcoded into the controller, the information comprising the key inaccessible to the processor.

4. The device of claim 3, wherein the information comprising the key is programmed at build time of the device at a factory or as part of a configuration of the device prior to delivery to an end user.

5. The device of claim 1, wherein the communication of the derived security credential is protected against unauthorized access using a protection code.

6. The device of claim 5, wherein the protection code comprises a hash-based message authentication code (HMAC).

7. The device of claim 1, wherein the controller is to retrieve the information comprising the key from a one-time programmable storage.

8. The device of claim 1, wherein the controller is to use the information comprising the key as a seed to generate the derived security credential.

9. The device of claim 8, wherein the controller is to input the information comprising the key and a salt value to a security credential derivation function that in response is to output the derived security credential.

10. The device of claim 9, wherein the controller comprises a random number generator to generate a random number used as the salt value.

11. The device of claim 1, wherein the trusted interface when in an open state is available for communicating information during the initial boot phase of the boot code, and the trusted interface when in a closed state is unavailable for communicating information after the initial boot phase of the boot code.

12. The device of claim 11, wherein the open state of the trusted interface is indicated by a flag set to a first value, and the closed state of the trusted interface is indicated by the flag set to a second value.

13. The device of claim 12, wherein the boot code is to inform the controller to change a value of the flag from the first value to the second value responsive to the boot code exiting the initial boot phase of the boot code.

14. A non-transitory machine-readable storage medium comprising instructions that upon execution cause a controller of a device to:
   access information comprising a key accessible by the controller and inaccessible by a processor of the device, the processor separate from the controller;
   input the information comprising the key into a security credential derivation function to produce a derived security credential; and
   communicate the derived security credential over a secure channel to a program code comprising a boot code executable on the processor, the derived security credential for use in protecting data stored in a memory, wherein the secure channel comprises a trusted interface between the controller and the boot code, the trusted interface settable to an open state to enable communication of selected information between the controller and the boot code, and to a closed state to disable communication of the selected information between the controller and the boot code.

15. The non-transitory machine-readable storage medium of claim 14, wherein the communication of the derived security credential over the secure channel uses a protection code that is useable to verify an integrity of information comprising the derived security credential.

16. The non-transitory machine-readable storage medium of claim 14, wherein the trusted interface when in the open state is available for communicating the selected information during an initial boot phase of the boot code, and the trusted interface when in the closed state is unavailable for communicating the selected information after the initial boot phase of the boot code.

17. The non-transitory machine-readable storage medium of claim 14, wherein the open state of the trusted interface is indicated by a flag set to a first value, and the closed state of the trusted interface is indicated by the flag set to a second value.

18. A method comprising:
   accessing, by an embedded controller of an electronic device, one-time programmable information;
   using, by the embedded controller, the one-time programmable information as a seed in producing a derived security credential;
   communicating, by the embedded controller, the derived security credential in a secure manner to a program code comprising a boot code executable on a processor of the electronic device, wherein the derived security credential is communicated in the secure manner using a trusted interface between the embedded controller and the boot code, the trusted interface settable to an open state to enable communication of information between the embedded controller and the boot code, and to a closed state to disable communication of information between the embedded controller and the boot code; and
   protecting, using the derived security credential, data stored in a memory.

19. The method of claim 18, wherein the one-time programmable information is included in the embedded controller or stored in an one-time programmable storage external of the embedded controller.

20. The method of claim 18, wherein the open state of the trusted interface is indicated by a flag set to a first value, and the closed state of the trusted interface is indicated by the flag set to a second value, and wherein the boot code informs the embedded controller to change a value of the flag from the first value to the second value responsive to the boot code exiting an initial boot phase of the boot code.

* * * * *